METHOD OF ETCHING THE CONTACTS ON A TRANSISTOR TO IMPROVE THE POWER OUTPUT THEREFOR

Filed March 9, 1965

INVENTOR.
RAYMOND LAUNAY

BY [signature]

AGENT

United States Patent Office 3,386,902

Patented June 4, 1968

3,386,902

METHOD OF ETCHING THE CONTACTS ON A TRANSISTOR TO IMPROVE THE POWER OUTPUT THEREFOR

Raymond Launay, Caen, Calvados, France, assignor to North American Philips Company, Inc., New York, N.Y., a corporation of Delaware Filed Mar. 9, 1965, Ser. No. 438,192

Claims priority, application France, Mar. 10, 1964, 966,820

3 Claims. (Cl. 204—143)

ABSTRACT OF THE DISCLOSURE

An etching process for reducing the size of an alloying pellet at the surface portion of a semiconductor so that the original boundary portion between the pellet and an alloyed portion is exposed over a width at least equal to the thickness of the alloyed portion.

It is known that, when semiconductor junctions are subjected to short excess voltages due to transient currents (overload), such excess voltages may destroy the junction or at least reduce its breakdown voltage and augment its reverse current. These phenomena, due to a local burn-out of the junction may appear particularly when a transistor is included in a constant current device, for instance for measuring purposes.

A destruction, if any, of a junction due to such excess voltages does not depend only upon the value of this excess voltage, but also upon the quantity of energy then passing through the junction.

It has been found that in a number of transistors, the break-down voltage of which is 40 v, the proportion of transistors destroyed after an instantaeous excess voltage of 100 v. is 12% with an energy of 2.5$\mu$ joules,
50% with an energy of 5$\mu$ joules,
100% with an energy of 160$\mu$ joules.

The lower limit of energy giving rise to burn-out of the junction may be as low as 1$\mu$ joule. The value of the excess voltage is, however, always considerably higher than the break-down voltage of the junction concerned, said break-down voltage being a defined voltage which does not lead to destruction of the junction.

Experience has shown that this sensitivity to excess voltages is particularly frequent in semiconductor devices obtained by alloy processes, particularly devices, the contacts of which are established by melting down a small quantity of an alloy of lead and an impurity in the form of a deposit shaped as a drop on a semiconductor crystal.

It is found, however, that the frequency of this defect varies from one lot of semiconductor devices to another and from one transistor to the other of the same lot, so that it may be concluded that this defect does not depend on the material employed or of the construction, but that it depends upon the particular configuration of some of these semiconductor devices.

The burn-out found is, in fact, local and superficial. If transistors exposed to excess voltages are observed in a microscope, it appears that at the instant of occurrence of the excess voltage sparks are produced in the proximity of the boundaries of the junctions and that after a heavy excess voltage a melted zone is produced at said places. Probably lower excess voltages may involve similar effects, but of minor importance.

From the prior art, for example, U.S. Patent No. 2,825,667, it is known that in order to raise the breakdown voltage of transistors the latter are exposed, after the establishment of the deposits, to an etching process at the ambient temperature in a bath composed of equal proportions of nitric acid (70%), hydrofluoride (52%) and distilled water. This bath intends to remove the burrs of the conductive deposit containing the impurity at the contact of the semiconductor crystal beyond the zone in which the said deposit has alloyed to the crystal.

However, experience has shown that, although such an etching operation improves the break-down voltage of a transistor, this does not suffice for the transistor, particularly a transistor of the n-p-n-type, to be satisfactorily protected from short excess voltages. This may be due to the fact that the zones in which the semiconductor crystal is alloyed to the impurity-containing deposit, is very thin at the periphery and does not sufficiently insulate the semiconductor crystal from said deposit.

According to the invention the method of establishing contacting deposits on semiconductor devices, which deposits are obtained by melting a conductive impurity-containing material onto a semiconductor monocrystal, said impurity providing the conductivity type of the semiconductor zone to be obtained, said melting producing an alloyed zone between said semiconductor monocrystal and said deposit, is characterized in that the deposit is etched partly away so that the peripheral line of separation between said deposit and the alloy zone is removed over a distance at least equal to the thickness of said alloy zone with respect to the peripheral line of separation between the latter and the semiconductor monocrystal.

Since due to the mutual heating the level of the alloy layer exceeds that of the semiconductor monocrystal and since this alloy has a greater resistance to the etchant than the deposit, it is furthermore possible to obtain, by this etching process, that the alloy of the deposit and of the semiconductor form, between said two lines of separation, a projection advantageous to the insulation of said deposit from the crystal.

The invention will now be described more fully with reference to the accompanying drawing, in which FIG. 1 shows in a sectional view, a mould suitable for the manufacture of transistors of the type sensitive to excess voltages.

Figure 1:
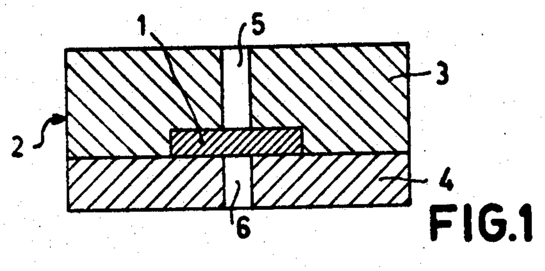

Transistors, some of which at least have weaker resistance to transient excess voltages, are usually manufactured in the following manner (see FIG. 1):

A semiconductor wafer of, for example, p-type germanium is disposed in a mould 2 of two detachable parts 3 and 4. Each of the parts 3 and 4 of the mould 2 is traversed by a duct 5 and 6 respectively. The ducts 5 and 6 permit of introducing down to the wafer 1 a pellet of an alloy of lead and antimony (the latter constitutes the impurity), which is then heated at the melting temperature.

Figure 2:
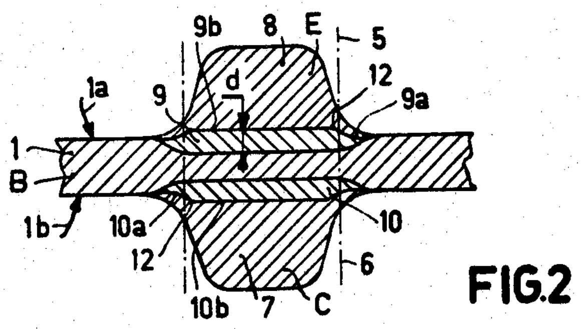
FIG. 2 is a diagrammatic sectional view of such a transistor.

Thus, in known manner by alloying with the germanium the semiconductor junction and the deposit 7 on the collector C and the deposit 8 emitter E are obtained, which deposits are of the n-type conductivity in the embodiment shown (see FIG. 2). Each of these operations may be completed by a thermal treatment to improve the alloying with the germanium, after which cooling is carried out for recrystallisation.

FIG. 2 shows that in this manner at the contact area with the germanium crystal alloy zones 9 and 10 of lead, antimony and germanium are obtained.

However, each of the lead-antimony pellets dissolve the germanium crystal over a larger surface than the surface defined by the opening of the duct 5 or 6 (said ducts are indicated by dot-and-dash lines in FIG. 2), so that the lead-antimony-germanium alloy zones 9 and 10 are larger than the sections of ducts 5 and 6 and that the peripheral boundaries 9*a* and 10*a* of said zones are less thick than the central part thereof.

Moreover, by the mutual melting of the germanium and of the lead antimony alloy the levels 9*b* and 10*b* of the alloy zones 9 and 10 respectively are slightly less high than the levels 1*a* and 1*b* of the surfaces of the crystal wafer 1.

In the marginal alloy zones 9*a* and 10*a* the quantity of lead and antimony which has penetrated between the mould and the wafer is small, so that the recrystallised layer of these marginal zones has a small thickness and the proportion of dissolved germanium is very slight at said place.

Consequently, the application of voltage to said junctions produces a non-uniform current density, since the irregularities of the thickness and of the crystalline structure at the boundary of the junction involve a reduction of resistance. Therefore a local increase in current is produced at said places and due to the resultant heating the junction may be modified to an extent such that partial melting may occur.

Figures 3, 4:
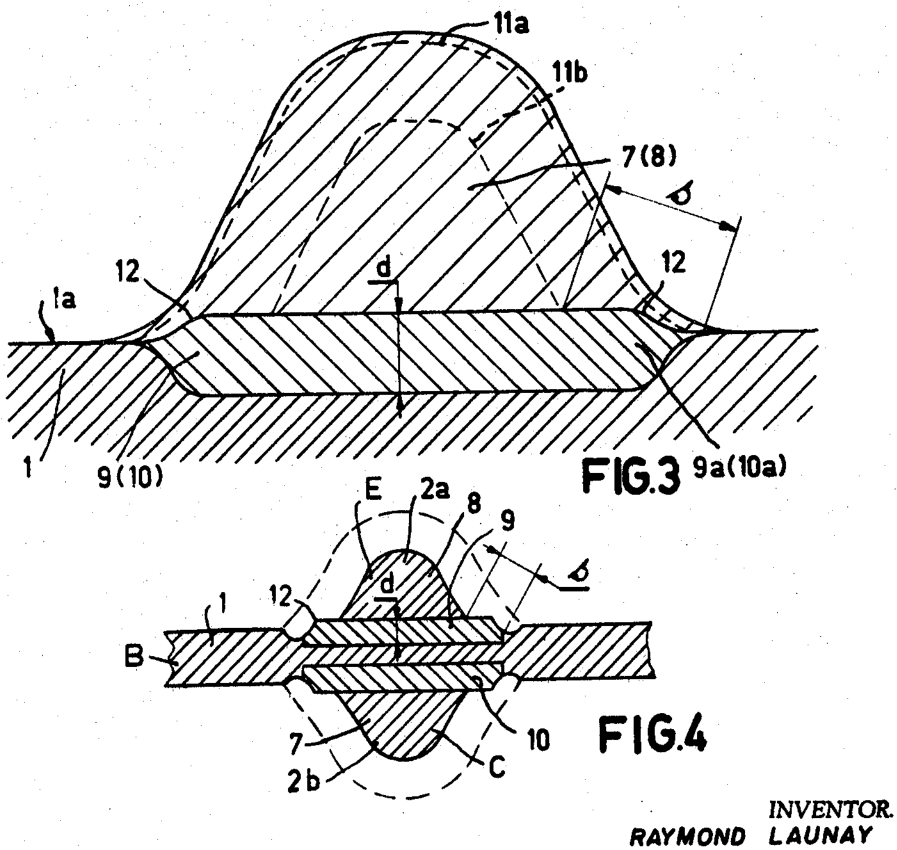
FIG. 3 is a diagrammatic sectional view illustrating the principle of the present invention.
FIG. 4 is a diagrammatic sectional view of a transistor, the contacting deposits of which are obtained by a method according to the invention.

As stated in the preamble it is known to etch the deposits superficially, for example in the sectional view of FIG. 3 over a thickness defined by the line 11*a*, so that all burrs of deposits 7 or 8 are removed from the crystal 1 in order to free the contours of the alloy zone 10.

However, in the case of excess voltage this does not prevent the current from passing to the marginal zones such as 9*a* or 10*a* with the disadvantages mentioned above.

According to the invention the etching of the deposit is continued until the material thereof is removed as indicated by the line 11*b* in FIG. 3. Thus the current can no longer pass over to the marginal zones 9*a* and 10*a*, so that it is compelled to traverse the alloy zones 9 and 10 in the region where they have their normal thickness *d*. This thickness is substantially uniform, since the alloy penetrates uniformly into the crystal down to the plane of the crystal lattice. This etching is possible, since the crystal and the alloy zones have considerably greater resistance to the etchant than the deposits.

Etching is finished when the periphery 12 designated by S in FIGS. 3 and 4 of the alloyed zone 9 is at least as broad as the thickness *d* of the alloy layer.

Owing to the resistance to the corrosion of the alloy layer, the periphery thereof will show a path 12 which, by prolonging the creeping path, increases the insulation between the etched deposit and the crystal 1.

Etching may be carried out by means of baths of acids of the kind referred to in the preamble, since these baths affect the contact-forming deposit without affecting the germanium, nor the germanium alloy produced. If the doping material is formed by indium, boron, gallium or aluminium, the bath contains 10 ccms. of $NO_3H$ (concentration 70%), 10 ccms. of HF (concentration 52%), and 10 ccms. of distilled water. The time required for obtaining the desired configuration of FIG. 4 is of the order of 9 minutes.

If the deposits consist of lead, antimony or lead, arsenic it is advantageous to use a nitric solution containing:

75% by weight of $NO_3H$ (non-fuming, $d$=1.38–40° Bé.)
25% by weight of deionized water (cold)

If the quantity used differs by 10% from the quantity mentioned above, etching takes place but the etching rate is varied in proportion to the said variations in nitric acid.

It is furthermore advantageous that the transistor thus etched can be directly soldered to its base contact before it is mounted and further processed in the conventional manner.

When this method is employed, the average power of the excess voltages likely to destroy a group of transistors passes from 10 to 200 *w.*, which suppresses so to say the fragility of the transistor. It will be noted that by etching the boundary of the recrystallised zone of small thickness over the distance S the burrs of the deposit adjacent the germanium are avoided, while a peripheral projection is formed, which insulates the semiconductor crystal from the emitter and collector contacts, while at the same time the defects of the break-down voltage and poor resistance to excess voltages are eliminated. This configuration may also be obtained by electrolytic etching alone or by this and a subsequent etching by oxygenised water. However, the improvement then obtained is smaller than that obtained by acidic etching.

For electrolytic etching it is advantageous to use as an electrolyte a solution at ambient temperature of NaOH or KOH, containing 10% by weight of a base in deionized water. For the electrolysis the collector and the emitter are interconnected, so that they form the anode, whereas the cathode may consist of a conventional metal, for example platinum or stainless steel. The electric current is fed to the bath so that the output is 40 ma. per transistor (i.e. about 20 ma. for the collector and 20 ma. for the emitter). The time required for the electrolysis is about 20 to 30 seconds.

After thorough rinsing this treatment may be completed by etching in oxygenised water. The following conditions are advantageous: the solution contains 15% by weight of oxygenised water, temperature is 75° C., duration of the treatment is 9 minutes.

According to circumstances it is more advantageous to choose either one or the other of the processes, while the acid etching is preferred for the transistors prior to mounting whereas the electrolytic etching alone or this process followed by etching in oxygenised water is preferred for the transistors after mounting.

It is furthermore possibe and even necessary to use the two etching processes one after the other, while adapting their durations.

As a matter of course, variations of the said methods are possible within the scope of the present invention, for example, by using equivalent other technical means.

What is claimed is:

1. In the manufacture of a semiconductor device, a method of improving the electrical characteristics of a p-n junction formed by alloying a metal mass containing an impurity of the one conductivity-forming type at a surface portion of the opposite conductivity type of a monocrystalline semiconductor to form an alloyed zone of the one conductivity type between the metal mass and the monocrystal, said alloyed zone forming with the monocrystal a junction extending to the surface of the monocrystal at the periphery of the zone, said alloyed zone having at its center a thickness *d* which reduces substantially to zero at its periphery, comprising the steps of subjecting same to a final etchng processes effective mainly on the metal mass until so much of the metal mass is removed as to expose the boundary of the alloyed zone over a width *s* which is at least equal to the thickness *d* of the alloyed zone at its center, said width *s* of the boundary remaining in the completed service.

2. A method as claimed in claim 1, wherein the etching process is performed by dipping the device in an acid bath containing nitric acid as the active agent for several minutes.

3. A method as claimed in claim 1, wherein the etching process is carried out for a time shorter than one minute by electrolytic agency in an alkaline bath, the active agent of which is a strong base.

References Cited

UNITED STATES PATENTS 3,088,888 5/1963 Leff ______________ 204—143

ROBERT K. MIHALEK, *Primary Examiner.*